(12) United States Patent
Krohn

(10) Patent No.: US 6,500,877 B1
(45) Date of Patent: Dec. 31, 2002

(54) UV CURABLE PAINT COMPOSITIONS AND METHOD OF MAKING AND APPLYING SAME

(75) Inventor: Roy C. Krohn, Fort Gratiot, MI (US)

(73) Assignee: Krohn Industries, Inc., Fort Gratiot, MI (US)

( * ) Notice: Subject to any disclaimer, the term of this patent is extended or adjusted under 35 U.S.C. 154(b) by 0 days.

(21) Appl. No.: 09/669,055

(22) Filed: Sep. 25, 2000

Related U.S. Application Data

(60) Provisional application No. 60/163,875, filed on Nov. 5, 1999.

(51) Int. Cl.$^7$ ................................................ C08F 2/46
(52) U.S. Cl. .......................... 522/96; 522/77; 522/79; 522/80; 522/81; 522/90; 522/97; 522/109; 522/110; 522/111; 522/182; 522/120; 522/121; 522/134; 522/135; 522/142; 522/144; 522/7; 522/11; 522/15; 522/16; 522/24; 522/25; 522/26
(58) Field of Search ........................ 522/79, 81, 80, 522/90, 92, 96, 182, 109, 110, 97, 134, 135, 142, 144, 121, 120, 7, 11, 15, 16, 24, 25, 26, 77; 252/600

(56) References Cited

U.S. PATENT DOCUMENTS

| | | |
|---|---|---|
| 3,968,056 A | 7/1976 | Bolon et al. |
| 3,988,647 A | 10/1976 | Bolon et al. |
| 4,049,844 A | 9/1977 | Bolon et al. |
| 4,088,801 A | 5/1978 | Bolon et al. |
| 4,188,449 A | 2/1980 | Lu et al. |
| RE30,274 E | 5/1980 | Bolon et al. |
| RE31,411 E | 10/1983 | Bolon et al. |
| 4,496,475 A | 1/1985 | Abrams |
| 4,544,624 A | 10/1985 | Nanpei et al. |
| 4,551,387 A | 11/1985 | Manabe et al. |
| 4,594,315 A | 6/1986 | Shibue et al. |
| 4,596,590 A | 6/1986 | Boaz |
| 4,640,981 A | 2/1987 | Dery et al. |
| 4,684,389 A | 8/1987 | Boaz |
| 4,770,685 A | 9/1988 | Boaz |
| 4,816,496 A | 3/1989 | Wada et al. |
| 4,828,758 A | 5/1989 | Gillberg-LaForce et al. |
| 4,837,289 A | 6/1989 | Mueller et al. |
| 4,844,947 A | 7/1989 | Kasner et al. |
| 4,855,184 A | 8/1989 | Klun et al. |
| 4,900,763 A | 2/1990 | Kraushaar |
| 4,902,578 A | 2/1990 | Kerr, III |
| 4,911,796 A | 3/1990 | Reed |
| 4,959,178 A | 9/1990 | Frentzel et al. |
| 4,960,614 A | 10/1990 | Durand |
| 4,964,948 A | 10/1990 | Reed |
| 5,006,397 A | 4/1991 | Durand |
| 5,049,480 A | 9/1991 | Nebe et al. |
| 5,051,654 A | 9/1991 | Nativi et al. |
| 5,068,714 A | 11/1991 | Seipler |
| 5,116,639 A | 5/1992 | Kolk et al. |
| 5,128,387 A * | 7/1992 | Shustack ..................... 522/92 |
| 5,149,971 A | 9/1992 | McElhaney et al. |
| 5,180,523 A | 1/1993 | Durand et al. |
| 5,204,223 A | 4/1993 | Taguchi et al. |
| 5,223,360 A | 6/1993 | Prengel et al. |
| 5,225,170 A | 7/1993 | Kolk et al. |
| 5,326,636 A | 7/1994 | Durand et al. |
| 5,382,233 A | 1/1995 | Brotz |
| 5,395,876 A | 3/1995 | Frentzel et al. |
| 5,424,182 A | 6/1995 | Marginean, Sr. et al. |
| 5,453,451 A | 9/1995 | Sokol |
| 5,470,643 A | 11/1995 | Dorfman |
| 5,494,715 A | 2/1996 | Glover |
| 5,504,045 A | 4/1996 | Emlemdi et al. |
| 5,629,247 A | 5/1997 | Prunchak |
| 5,773,487 A | 6/1998 | Sokol |
| 5,783,108 A | 7/1998 | MacKay |
| 5,784,197 A | 7/1998 | Frey et al. |
| 5,866,628 A | 2/1999 | Likavec et al. |
| 5,914,162 A | 6/1999 | Bilkadi |
| 5,932,350 A | 8/1999 | Lauer et al. |
| 5,959,020 A | 9/1999 | Oliveri et al. |
| 6,017,593 A | 1/2000 | Daly et al. |
| 6,020,528 A | 2/2000 | Leppard et al. |
| 6,146,288 A | 11/2000 | Crast et al. |
| 6,162,511 A | 12/2000 | Garnett et al. |
| 6,165,564 A | 12/2000 | Crast et al. |

FOREIGN PATENT DOCUMENTS

| | | |
|---|---|---|
| EP | 0 081 323 A1 | 6/1983 |
| EP | 0 820 217 A1 | 1/1998 |

OTHER PUBLICATIONS

XP002140476, English language abstract for JP 05 311103 A, published Nov. 22, 1993, Tanaka Kikinzoku Kogyo KK.
XP002140477, English language abstract for JP 06 016721 A, published Jan. 25, 1994, Nippon Kayaku KK.

\* cited by examiner

*Primary Examiner*—Nathan M. Nutter
*Assistant Examiner*—Sanza McClendon
(74) *Attorney, Agent, or Firm*—Brooks & Kushman, P.C.

(57) ABSTRACT

The present invention discloses an ultraviolet light curable paint composition and method for applying and making such a composition to a substrate. Suitable substrates include glass, metals, and various plastics such as polycarbonates. The disclosed composition does not contain any significant amount of volatile organic solvents that do not become incorporated in the coating or are released to ambient after curing.

9 Claims, No Drawings

UV CURABLE PAINT COMPOSITIONS AND METHOD OF MAKING AND APPLYING SAME

CROSS-REFERENCE TO RELATED APPLICATION

This application claims the benefit of U.S. provisional patent application Ser. No. 60/163,875, filed Nov. 5, 1999, and is related to U.S. patent application Ser. No. 09/413,577 filed Oct. 6, 1999 and to U.S. patent application Ser. No. 09/668,997 filed Sep. 25, 2000.

TECHNICAL FIELD

The present invention relates to ultraviolet light (UV) curable paint compositions capable of producing coating with enhanced corrosion and weathering resistance.

BACKGROUND OF THE INVENTION

UV radiation curable paint compositions are applied to a substrate through spraying, screen printing, dipping or brushing for the protection or decoration of the substrate. In the usual application, a substrate such as metal, glass, or plastic is coated with the paint composition and then UV light is introduced to compete the curing process. The UV curable paint compositions offer many advantages over typical heat curable compositions.

Heat curable compositions require the use of organic solvents that contain a significant amount of volatile organic compounds (VOCs). These VOCs escape into the atmosphere while the heat curable composition dries. Such solvent based systems are undesirable because of the hazards and expenses associated with VOCs. The hazards include water and air pollution and the expenses include the cost of complying with strict government regulation on solvent emission levels. In contrast, UV curable compositions contain reactive monomers instead of solvents; thus eliminating the detrimental effects of the VOCs.

The use of heat curable compositions not only raises environmental concerns but other disadvantages exist with their use as well. Heat curable compositions suffer from slow cure times which lead to decreased productivity. These compositions require high energy for curing due to energy loss as well as the energy required to heat the substrate. Additionally, many heat curable compositions yield poor film properties that result in decreased value of the end product.

Although UV curable compositions exhibit superior properties and performance over their heat curable counterparts, UV curable compositions themselves suffer from certain disadvantages. Generally, UV compositions have high molecular weights and a substantial degree of cross linkage due to the highly reactive nature of the composition. As a result, many of these compositions suffer from low durability and resin shrinkage. With the use of many such compositions, an inordinately high amount of UV light is required to cure. New formulations that lessen these problems typically suffer from diminished abrasion, chemical, and scratch resistance as well as low thermal stability and adhesion.

An additional disadvantage of typical UV compositions is their lack of stability which results in dispersion. With some compositions, suspended solids fall out of solution after a period of one to two days. Dispersion adversely affects the gloss and clarity of the finished product. To combat this problem, new compositions have been formulated with higher viscosities which often lessen the flowability of the composition. These viscous formulations rule out spray application and provide for an unsuitably high dipping thickness.

Accordingly, there exists a need to provide environmentally safe UV curable paint compositions which exhibit improved appearance, weatherability, corrosion resistance and workability. Additionally, there is a need to provide a method of applying an improved composition which furthers the goal of improved performance.

SUMMARY OF INVENTION

It is an object of the present invention to provide an improved paint composition that is curable by ultraviolet light.

It is another object of the present invention to provide an improved paint composition that can be applied by spraying, screen printing, dipping, and brushing.

It is yet another object of the present invention to provide an improved paint composition that is capable of protecting metal surfaces from chemical corrosion and weathering.

It is still another object of the present invention to provide an improved paint composition that can be used to coat the metal parts in the undercarriage of an automobile.

It is still another object of the present invention to provide an improved paint composition that comprises at least one aliphatic acrylated oligomer that can be used to coat a metallic substrate such that no significant amount of volatile organic solvents do not become incorporated in the coating after the composition is cured.

The present invention discloses an ultraviolet light curable paint composition and method for making such a composition that may be used to produce a paint coating on a substrate. The disclosed composition does not contain any significant amount of volatile organic solvents that do not become incorporated in the coating after curing. Specifically, the paint composition contains 5% or less volatile organic solvents by weight. The disclosed invention provides a paint composition that is capable of protecting metal parts from chemical corrosion and weathering. In particular, automobile undercarriage components that are coated with the disclosed paint composition and then cured with ultraviolet light experience improved protection from the harmful effects of salt and adverse weather conditions. Further, the cured paint composition produces a coating with improved appearance and with improved resistance to rubbing off. Automobile undercarriage components include, but are not limited, to suspension swing arms, coil spring brackets, suspension stabilizers, frames, axles, and brake arms. The disclosed invention allows these automobile components to be coated more economically than the standard electronic primer coat basecoat and powder coat that is traditionally used in coating automobile undercarriage components.

In accordance with one aspect of the invention, an ultraviolet light curable paint composition is provided. The paint composition comprises a mixture of one or more aliphatic acrylated oligomers, wherein the aliphatic acrylated oligomer mixture is present in an amount of about 8% to 60% of the paint composition. All percentages of the paint composition as expressed in this document refer to the weight percentage of the stated component to the total weight of the paint composition.

The paint composition preferably comprises an isobornyl acrylate monomer in an amount of about 20% to 60% of the paint composition, optionally an adhesion promoter in an amount of 1% to 12%, a photoinitiator in an amount of about 1% to 16% of the paint composition, optionally, a flow promoting agent in an amount of about 0.1% to 6% of the paint composition, and a pigmented composition in an amount of 0% to 50%.

In accordance with yet another aspect of the invention, a method is provided for depositing or applying a paint coating on a substrate. The method comprises a first step of applying to the substrate a paint-containing fluid-phase composition ("paint composition"). Suitable methods of applying the paint composition to the substrate include spraying, screen-printing, dipping, and brushing. The paint composition comprises a mixture of aliphatic acrylated oligomers, wherein the aliphatic acrylated oligomer is present in an amount of about 8% to 60% of the paint composition. The paint composition also includes an isobornyl acrylate monomer in an amount of about 20% to 60% of the paint composition, a photoinitiator in an amount of about 1% to 16% of the paint composition, a flow promoting agent in an amount of about 0.1% to 6% of the paint composition, a pigmented composition in an amount of 0% to 50% of the paint composition, and optionally an adhesion promoter in an amount of 1% to 12%.

The method also includes a second step of illuminating the paint composition on the substrate with an ultraviolet light to cause the paint composition to cure into the paint coating.

In accordance with this method, the paint composition can be selectively deposited on the substrate at specific locations where paint plating is desired. The paint composition need not be applied to the entire substrate.

BEST MODE FOR CARRYING OUT THE INVENTION

Paint Compositions

Reference will now be made in detail to presently preferred compositions or embodiments and methods of the invention, which constitute the best modes of practicing the invention presently known to the inventor.

In accordance with one aspect of the invention, a presently preferred ultraviolet light curable paint composition ("paint composition") is provided. In this preferred embodiment, the paint composition includes a mixture of aliphatic acrylated oligomers. The aliphatic acrylated oligomer mixture is present in an amount of about 8% to 60% of the paint composition. If the paint composition is applied by spraying, the aliphatic acrylated oligomer mixture is more preferably present in an amount of about 30% to 55%, and most preferably about 45%. If the paint composition is applied by screen printing, the aliphatic acrylated oligomer mixture is more preferably present in an amount of about 8% to 60%, and most preferably about 50%. The aliphatic acrylated oligomer preferably comprises one or more urethane oligomers. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 10% with 1,6-hexanediol diacrylate) commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The preferred paint composition also includes an isobornyl acrylate monomer in an amount of about 20% to 60% of the paint composition. If the paint composition is applied by spraying, the isobornyl acrylate monomer is more preferably present in an amount of about 20% to 50%, and most preferably about 27%. If the paint composition is applied by screen printing, the isobornyl acrylate monomer is more preferably present in an amount of about 20% to 60%, and most preferably about 31%. Suitable isobornyl acrylate monomers include Sartomer SR423 (isobornyl methacrylate):

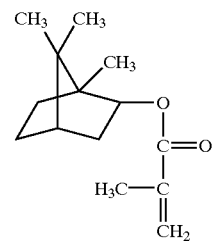

and SR506 (isobornyl acrylate):

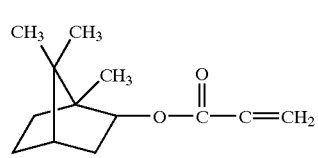

available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

The preferred paint composition may optionally include an adhesion promoter in an amount of about 1% to 12% of the paint composition. If the paint composition is applied by spraying, the adhesion promoter is more preferably present in an amount of about 1% to 11%, and most preferably about 9%. If the paint composition is applied by screen printing, the adhesion promoter is more preferably present in an amount of about 4% to 11% and most preferably about 9%. Suitable adhesion promoters include Ebecryl 168

(methacrylated acidic adhesion promoter), commercially available from Radcure Corp.; and Sartomer CN 704 (acrylated polyester adhesion promoter) and CD 9052 (trifunctional acid ester), commercially available from Sartomer Corp. The preferred adhesion promoter is Ebecryl 168 which is a methacrylated acidic adhesion promoter. Combinations of these materials may also be employed herein.

The preferred paint composition also includes a pigmented composition in an amount of about 0% to 50% of the paint composition. If the paint composition is applied by spraying, the pigmented composition is more preferably present in an amount of about 1% to 20%, and most preferably about 4%. If the paint composition is applied by screen printing, the pigmented composition is more preferably present in an amount of about 1% to 50%, and most preferably about 2%. Suitable pigmented compositions include Venus #91 pigment and Palegold #400 available from NazDar of Atlanta, Ga.; BB 1355, ST8703, ST 8657, and ST 8003 available from Element is Specialties of Jersey City, N.J.; Tint-AYD PC 9003 Titanium Dioxide available from Daniel Products Company of Jersey City, N.J., and A1 #200 pigment available from Silberline of Leven, England. The preferred pigment used will depend on the desired color of the paint. For example, if a black paint composition is desired, BB 1355 is the preferred pigment. If the pigment is omitted from the composition, a clear paint composition is obtained. Combinations of these materials may also be employed herein.

This preferred paint composition also includes a photoinitiator in an amount of about 1% to 16% of the paint composition. If the paint composition is applied by spraying, the photoinitiator is more preferably present in an amount of about 3% to 12%, and most preferably about 10%. If the paint composition is applied by screen printing, the photoinitiator is more preferably present in an amount of about 2% to 16%, and most preferably about 4%. Suitable photoinitiators include Irgacure 184 (1-hydroxycyclohexyl phenyl ketone),

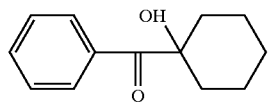

Irgacure 907 (2-methyl-1-[4-(methylthio)phenyl]-2-morpholino propan-1-one),

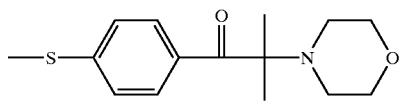

Irgacure 392 (2-benzyl-2-N,N-dimethylamino-1-(4-morpholinophenyl)-1-butanone),

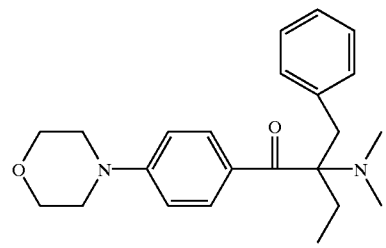

Irgacure 500 (the combination of 50% 1-hydroxy cyclohexyl phenyl ketone,

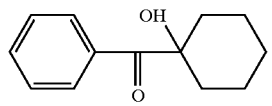

and 50% benzophenone),

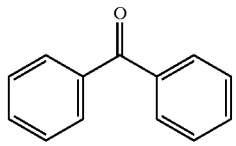

Irgacure 651 (2,2-dimethoxy-1,2-diphenylethan-1-one),

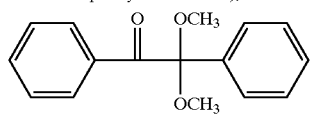

Irgacure 1700 (the combination of 25% bis(2,6-dimethoxybenzoyl-2,4-,4-trimethyl pentyl) phosphine oxide,

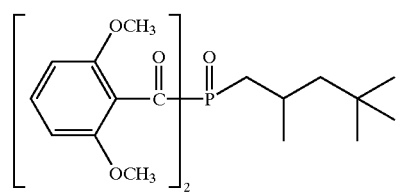

and 75% 2-hydroxy-2-methyl-1-phenyl-propan-1-one),

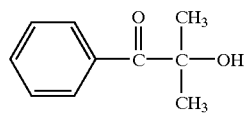

and DAROCUR 1173 (2-hydroxy-2-methyl-1-phenyl-1-propane),

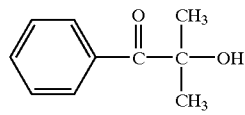

and DAROCUR 4265 (the combination of 50% 2,4,6-trimethylbenzoyldiphenyl-phosphine oxide,

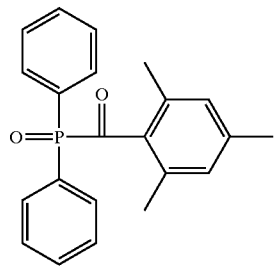

and 50% 2-hydroxy 2-methyl-1-phenyl-propan-1-one),

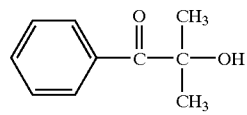

available commercially from Ciba-Geigy Corp., Tarrytown, N.Y.; CYRACURE UVI-6974 (mixed triaryl sulfonium hexafluoroantimonate salts) and cyracure UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

The preferred paint composition may optionally include a flow promoting agent in an amount of about 0.1% to 6% of the paint composition. If the paint composition is applied by spraying, the flow promoting agent is more preferably present in an amount of about 2% to 6%, and most preferably about 5%. If the paint composition is applied by screen printing, the flow promoting agent is more preferably present in an amount of about 1% to 5%, and most preferably about 4%. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

To illustrate, the following example sets forth a presently preferred paint composition according to this aspect of the invention.

EXAMPLE 1

This example provides a preferred paint composition according to the invention that can be used for applying a black paint coating to a substrate preferably by either spray or flexographic techniques. Suitable substrates include cast iron and other metals. The paint composition was made from the following components:

| Component | Approximate Weight % |
| --- | --- |
| Ebecryl 264 | 22.5 |
| Ebecryl 284 | 22.5 |
| IBOA | 27.1 |
| Ebecryl 168 | 9.1 |
| Modaflow | 4.5 |
| Irgacure 1700 | 10.4 |
| Black BB1355 | 3.9 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the BB 1355 is introduced into the pan and mixed for 1 to 2 minutes at a speed of 2000 rpm. The temperature during mixing is monitored. The mixing is temporarily suspended if the temperature exceeds 100° F.

EXAMPLE 2

This example provides a preferred paint composition according to the invention that can be used for applying a black paint coating to a substrate preferably by a spray technique. Suitable substrates include cast iron and other metals. The paint composition was made from the following components:

| Component | Approximate Weight % |
| --- | --- |
| Ebecryl 264 | 16.1 |
| Ebecryl 284 | 16.1 |
| IBOA | 47.9 |
| Ebecryl 168 | 6.5 |
| Modaflow | 3.2 |
| Irgacure 1700 | 7.4 |
| Black BB1355 | 2.8 |
| Total | 100.00 |

In this example, the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the BB 1355 is introduced into the pan and mixed for 1 to 2 minutes at a speed of 2000 rpm. The temperature during mixing is monitored. The mixing is temporarily suspended if the temperature exceeds 100° F.

EXAMPLE 3

This example provides a preferred paint composition according to the invention that can be used for applying a green paint coating to a substrate preferably by screen printing. Suitable substrates include metals and polycarbonates. The paint composition was made from the following components:

| Component | Approximate Weight % |
| --- | --- |
| Ebecryl 264 | 23.1 |
| Ebecryl 284 | 26.8 |
| IBOA | 31.2 |
| Ebecryl 168 | 8.9 |
| Modaflow | 3.6 |
| Irgacure 1700 | 4.4 |
| Green ST8703 | 2.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the Green ST8703 pigment is introduced into the pan and mixed for 1 to 2 minutes at a speed of 2000 rpm. The temperature during mixing is monitored. The mixing is temporarily suspended if the temperature exceeds 100° F.

EXAMPLE 4

This example provides a preferred paint composition according to the invention that can be used for applying a orange paint coating to a substrate preferably by screen printing. Suitable substrates include metals and polycarbonate. The paint composition was made from the following components:

| Component | Approximate Weight % |
| --- | --- |
| Ebecryl 264 | 23.1 |
| Ebecryl 284 | 26.8 |
| IBOA | 31.2 |
| Ebecryl 168 | 8.9 |
| Modaflow | 3.6 |
| Irgacure 1700 | 4.4 |
| Orange ST8657 | 2.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the Orange ST8657 pigment is introduced into the pan and mixed for 1 to 2 minutes at a speed of 2000 rpm. The temperature during mixing is monitored. The mixing is temporarily suspended if the temperature exceeds 100° F.

EXAMPLE 5

This example provides a preferred paint composition according to the invention that can be used for applying a clear paint coating to a substrate preferably by spray or flexographic techniques. Suitable substrates include glass, metals, and polycarbonate. The paint composition was made from the following components:

| Component | Approximate Weight % |
| --- | --- |
| Ebecryl 264 | 22.7 |
| Ebecryl 284 | 19.7 |
| IBOA | 43.2 |
| Ebecryl 168 | 7.6 |
| Modaflow | 3.0 |
| Irgacure 1700 | 3.8 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the final step, the Ebecryl 168 adhesion promoter is introduced into the pan and mixed for 1 to 2 minutes at a speed of 2000 rpm. The temperature during mixing is monitored. The mixing is temporarily suspended if the temperature exceeds 100° F.

EXAMPLE 6

This example provides a preferred paint composition according to the invention that can be used for applying a metallic copper-colored paint coating to a substrate preferably by screen printing. Suitable substrates include metals and polycarbonates. The paint composition was made from the following components:

| Component | Approximate Weight % |
| --- | --- |
| Ebecryl 264 | 27.9 |
| Ebecryl 284 | 16.9 |
| IBOA | 22.2 |
| Ebecryl 168 | 4.1 |
| Modaflow | 4.5 |
| Irgacure 1700 | 3.1 |
| Palegold #400 pigment (copper) | 20.5 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the Palegold #400 pigment is introduced into the pan and mixed for 1 to 2 minutes at a speed of 2000 rpm. The temperature during mixing is monitored. The mixing is temporarily suspended if the temperature exceeds 100° F.

EXAMPLE 7

This example provides a preferred paint composition according to the invention that can be used for applying a metallic aluminum-colored paint coating to a substrate preferably by screen printing. Suitable substrates include metals and polycarbonates. The paint composition was made from the following components:

| Component | Approximate Weight % |
| --- | --- |
| Ebecryl 264 | 20.0 |
| Ebecryl 284 | 20.0 |
| IBOA | 24.0 |
| Ebecryl 168 | 8.0 |
| Modaflow | 4.0 |
| Irgacure 1700 | 4.0 |
| Al #200 pigment | 20.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the Al #200 pigment is introduced into the pan and mixed for 1 to 2 minutes at a speed of 2000 rpm. The temperature during mixing is monitored. The mixing is temporarily suspended if the temperature exceeds 100° F.

EXAMPLE 8

This example provides a preferred paint composition according to the invention that can be used for applying a metallic gold-colored paint coating to a substrate preferably by screen printing. Suitable substrates include metals and polycarbonates. The paint composition was made from the following components:

| Component | Approximate Weight % |
|---|---|
| Ebecryl 264 | 10.5 |
| Ebecryl 284 | 10.5 |
| IBOA | 22.5 |
| Ebecryl 168 | 4.2 |
| Modaflow | 2.2 |
| Irgacure 1700 | 3.9 |
| Venus #91 pigment | 46.2 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the Venus #91 pigment is introduced into the pan and mixed for 1 to 2 minutes at a speed of 2000 rpm. The temperature during mixing is monitored. The mixing is temporarily suspended if the temperature exceeds 100° F.

EXAMPLE 9

This example provides a preferred paint composition according to the invention that can be used for applying a white colored paint coating to a substrate preferably by screen printing. Suitable substrates include metals and polycarbonates. The paint composition was made from the following components:

| Component | A. Approximate Weight % | B. Approximate Weight % | C. Approximate Weight % |
|---|---|---|---|
| Ebecryl 264 | 4.9 | 7.8 | 12.0 |
| Ebecryl 284 | 4.3 | 6.8 | 10.4 |
| IBOA | 46.7 | 53.0 | 40.0 |
| Ebecryl 168 | 2.1 | 2.5 | 3.1 |
| Modaflow | 1.5 | 2.4 | 2.6 |
| Irgacure 1700 | 6.7 | 10.7 | 14.1 |
| ST8003 white pigment | 33.8 | 16.8 | 17.8 |
| Total | 100.00 | 100.00 | 100.00 |

In this example, the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the next step, the Ebecryl 168 adhesion promoter is added and mixed for 1 to 2 minutes at a speed of 2000 rpm. In the final step, the ST8003 pigment is introduced into the pan and mixed for 1 to 2 minutes at a speed of 2000 rpm. The temperature during mixing is monitored. The mixing is temporarily suspended if the temperature exceeds 100° F.

Method for Depositing a Paint Coating on a Substrate

In accordance with still another aspect of the invention, a method is provided for depositing a paint coating on a suitable substrate. The method comprises a first step of applying a fluid-phase composition ("paint composition") to the substrate.

The paint composition comprises an aliphatic acrylated oligomer mixture, the aliphatic acrylated oligomer mixture being present in an amount of about 8% to 60% of the paint composition; an isobornyl acrylate monomer in an amount of about 20% to 60% of the paint composition; an photo-initiator in an amount of about 1% to 16% of the paint composition; a flow promoting agent in an amount of about 0.1% to 6% of the paint composition, a pigment containing composition in an amount of 0% to 50%, and optionally an adhesion promoter in an amount of 1% to 12%. The preferred paint compositions according to this method are those described herein, for example, including the compositions described in examples 1 through 9.

The paint composition may be applied to the substrate using a number of different techniques. The paint composition may be applied, for example, by direct brush application, or it may be sprayed onto the substrate surface. If automobile undercarriage components are to be coated, the spray technique is particularly useful, in that the components may be spray coated on a conveyorized system. The paint composition may also be applied using a screen printing technique. In such screen printing technique, a "screen" as the term is used in the screen printing industry is used to regulate the flow of liquid composition onto the substrate surface. The paint composition typically would be applied to the screen as the latter contacts the substrate. The paint composition flows through the silk screen to the substrate, whereupon it adheres to the substrate at the desired film thickness. Screen printing techniques suitable for this purpose include known techniques, but wherein the process is adjusted in ways known to persons of ordinary skill in the art to accommodate the viscosity, flowability, etc. of the liquid-phase composition, and the substrate of surface properties. Flexographic techniques using pinch rollers to contact the paint composition with a rolling substrate may be used.

The method includes a second step of illuminating the paint-containing fluid-phase composition on the substrate with an ultraviolet light to cause the paint-containing fluid-phase composition to cure into the paint coating. This illumination may be carried out in any number of ways, provided the ultraviolet light or radiation impinges upon the paint composition so that the paint composition is caused to polymerize to form the coating, layer, film, etc. If automotive undercarriage components are to be coated, steps of coating the components by spraying and illuminating the coated parts may be sequentially performed in a conveyorized system.

Curing preferably takes place by free radical polymerization, which is initiated by an ultraviolet radiation source. Various ultraviolet light sources may be used, depending on the application. Preferred ultraviolet radiation sources for a number of applications include known ultraviolet lighting equipment with energy intensity settings of, for example, 125 watts, 200 watts, and 300 watts per square inch.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ultraviolet (UV) curable paint composition for use in coating a metallic substrate comprising:

a mixture of at least one aliphatic acrylated oligomer;

an isobornyl acrylate monomer;

a pigmented material; and a photoinitiator; wherein the ultraviolet curable paint composition does not contain any significant amount of volatile organic solvents that do not become incorporated in the coating after the composition is cured and the mixture of at least one aliphatic acrylated oligomer consists essentially of one or more urethane oligomers.

2. The UV curable paint composition of claim 1, wherein:

the aliphatic acrylated oligomer mixture is present in an amount of about 8% to 60% of the weight of the paint composition;

the isobornyl acrylate monomer is present in an amount of about 20% to 60% of the weight of the paint composition;

the pigmented material is present in an amount of about 0% to 50% of the weight of the paint composition; and the photoinitiator is present in an amount of about 1% to 16% of the weight of the paint composition.

3. The UV curable paint composition of claim 2 further comprising:

an adhesion promoter in an amount of about 1% to 12% of the weight of the paint composition; and a flow promoting agent in an amount of about 0.1% to 6% of the weight of the paint composition.

4. The paint composition of claim 1 wherein the aliphatic acrylated oligomer in the mixture is selected from the group consisting of:

a) aliphatic urethane diacrylate diluted 10% by volume with 1,6-hexanediol diacrylate;

b) aliphatic urethane triacrylate diluted 15% by volume with 1,6-hexanediol diacrylate);

c) aliphatic urethane diacrylate blended with 20% by volume tripropylene glycol diacrylate;

d) aliphatic urethane diacrylate blended with 25% by volume ethoxylated trimethylol propane triacrylate;

e) aliphatic urethane diacrylate blended with 19% by volume 2(2-ethoxyethoxy)ethyl acrylate;

f) aliphatic urethane diacrylate blended with 20% by volume tripropylene glycol diacrylate;

g) aliphatic urethane diacrylate blended with 20% by volume tripropylene glycol diacrylate;

h) aliphatic urethane diacrylate blended with 25% by volume tripropylene glycol diacrylate; and i) aliphatic urethane diacrylate;

j) and mixtures thereof.

5. The paint composition of claim 1 wherein the isobornyl acrylate monomer in the mixture is selected from the group consisting of isobornyl acrylate, isobornyl methacrylate, and mixtures thereof.

6. The paint composition of claim 1 wherein the photoinitiator is selected from the group consisting of:

1-hydroxycyclohexyl phenyl ketone;

2-methyl-1-[4-(methylthio)phenyl]-2-morpholino propan-1-;

the combination of 50% 1-hydroxy cyclohexyl phenyl ketone and 50% benzophenone;

2,2-dimethoxy-1,2-diphenylethan-1-one;

the combination of 25% bis(2,6-dimethoxybenzoyl-2,4-, 4-trimethyl pentyl phosphine oxide and 75% 2-hydroxy-2-methyl-1-phenyl-propan-1-one;

2-hydroxy-2-methyl-1-phenyl-1-propane;

the combination of 50% 2,4,6-trimethylbenzoyldiphenylphosphine oxide and 50% 2-hydroxy 2-methyl-1-phenyl-propan-1-one;

mixed triaryl sulfonium hexafluoroantimonate salts, mixed triaryl sulfonium hexafluorophosphate salts, and mixtures thereof.

7. The paint composition of claim 3 wherein the adhesion promoter is selected from the group consisting of:

methacrylated acidic adhesion promoter;

acrylated polyester adhesion promoter;

trifunctional acid ester; and mixtures thereof.

8. The UV curable paint composition of claim 1, wherein:

the aliphatic acrylated oligomer mixture is present in an amount of about 30% to 55% of the weight of the paint composition;

the isobornyl acrylate monomer is present in an amount of about 20% to 50% of the weight of the paint composition;

the pigmented material is present in an amount of about 1% to 20% of the weight of the paint composition; and the photoinitiator is present in an amount of about 3% to 12% of the weight of the paint composition.

9. The UV curable paint composition of claim 1, wherein:

the aliphatic acrylated oligomer mixture is present in an amount of about 8% to 60% of the weight of the paint composition;

the isobornyl acrylate monomer is present in an amount of about 20% to 60% of the weight of the paint composition;

the pigmented material is present in an amount of about 1% to 50% of the weight of the paint composition; and the photoinitiator is present in an amount of about 2% to 16% of the weight of the paint composition.

* * * * *